June 16, 1964 R. F. TILGNER 3,137,020
ROTARY BRUSH SECTION

Filed May 23, 1961 6 Sheets-Sheet 1

INVENTOR.
RALPH F. TILGNER

BY
Oscar L. Spencer
ATTORNEY

June 16, 1964  R. F. TILGNER  3,137,020
ROTARY BRUSH SECTION
Filed May 23, 1961  6 Sheets-Sheet 2

INVENTOR.
RALPH F. TILGNER
BY
Oscar L. Spencer
ATTORNEY

INVENTOR.
RALPH F. TILGNER
BY Oscar L. Spencer
ATTORNEY

June 16, 1964  R. F. TILGNER  3,137,020
ROTARY BRUSH SECTION
Filed May 23, 1961  6 Sheets-Sheet 4

INVENTOR.
RALPH F. TILGNER
BY
Oscar L. Spencer
ATTORNEY

INVENTOR.
RALPH F. TILGNER
BY
Oscar L Spencer
ATTORNEY

June 16, 1964  R. F. TILGNER  3,137,020
ROTARY BRUSH SECTION

Filed May 23, 1961  6 Sheets-Sheet 6

INVENTOR.
RALPH F. TILGNER
BY
Oscar L. Spencer
ATTORNEY

United States Patent Office 3,137,020
Patented June 16, 1964

3,137,020
ROTARY BRUSH SECTION
Ralph F. Tilgner, Ellicott City, Md., assignor to Pittsburgh Plate Glass Company, Pittsburgh, Pa., a corporation of Pennsylvania
Filed May 23, 1961, Ser. No. 111,974
17 Claims. (Cl. 15—179)

This invention relates to a novel brushing element and to a process and apparatus for assembling the same, and it has particular relation to the provision of a novel, disc-like, power-driven unit having a channel backing ring and radially projecting, doubled fill material, and to a locking core structure for said fill material which positively and permanently exerts a constrictive pressure, clamping the bights of the fill material against the bottom of the channel backing ring even when the brushing element is rotated at relatively high speed.

It has heretofore been disclosed to form power-driven, disc-like brush units comprising a continuous, ring-like channel backing and doubled, radially projecting fill material having the bight portions thereof looped about a central core to lock the fill material in place in the channel backing ring. Usually, the core has comprised a continuous ring of metal, as for example, of iron or steel. In one construction, as illustrated in United States Patent 2,228,337 to Whittle, this ring is formed of a band of sheet metal having its edges radially outwardly doubled to provide an annular disc of keyhole section. In other constructions, the core comprises a metal ring which often is held down in the channel backing ring against the centrifugal force exerted when the brush is rapidly rotated, by teeth formed by punching tabs in the sides of the channel backing ring and bending them parallel to the axis of the brush and engaging the outer perimeter of the core. Obviously, the formation of the teeth greatly weakens said side walls. Examples of this type of core are included in United States Patent 2,609,242 to Nelson.

It will be apparent that methods of forming such units are relatively slow and complicated. Also, it is often difficult to obtain such uniform distribution of the fill material around the channel backing ring as will assure relatively vibration-free running of the units at high speeds. It will be apparent that such constructions, and especially those involving the teeth holding the core, have parts with raw, sharp edges that tend to bite or chafe the fill material. Cores of metal, such as iron or steel, are also often subjected to corrosion by fumes and moisture in the atmosphere, and liquids, such as water or acids, or other agencies of corrosion to which the units may be subjected in service.

A further objectionable characteristic of the metal ring cores resides in the fact that the metal cannot be stretched appreciably and it has but slight elastomeric characteristics adapting it to be prestressed firmly to grip the fill material against the bottom of the channel backing ring. In those instances wherein the fill material is initially firmly held by the core, vibration and flexing of the fill material in service tends to produce packing, and thus the grip of the core upon the fill material is weakened. The material is then free to migrate around the channel to produce objectionable packing at various points around the circumference of the unit. In some instances, fill material may even tend to loosen, thus further aggravating the weakness of the unit and ultimately producing failure thereof. In the conventional construction involving the metallic core, it will also be apparent that as the brush is rapidly rotated, the stock tends to fly by centrifugal force away from contact with the bottom of the channel backing ring, and it is quite possible that at high speeds the looped portions of the fill material may even lose appreciable contact with the bottom of the channel. This reduces the grip of the fill material upon the channel and exposes the fill material to a further tendency to migrate peripherally around the channel when the unit is subjected to heavy loads in a brushing operation.

In accordance with the provisions of this invention, a disc-like brush unit and a method of assembling the same are provided. In this construction and method, a strong but somewhat elastomeric cord or strand is used to form a core holding the fill material in a channel backing ring. Initially, the channel backing ring is but partially shaped, being of outwardly flaring V-section.

In forming units in accordance with the provisions of the present invention, the elastomeric cord is first attached at one end to the partly formed ring and preferably, one or more turns of the cord are wound into the bottom of the channel thereof. The double length fill material is then fed as a continuous layer, across the edges of the channel and also across the first turn or turns of cord disposed in the channel, while an extension of the turns of cord in the channel is concurrently and continuously wrapped into place upon the outer perimeter of the layer of fill material. During the latter operation, the cord is kept under tension constrictively to press the fill material into the channel. Subsequently, a cord holding tape is disposed in the channel and as many turns of cord as required to form a ring-like core of adequate strength are wrapped in place under enough tension substantially to stretch the cord as it is laid down, but without subjecting the latter to breakage.

Finally, the bundle of cord formed by the turns is secured and also, the terminus of the wraps or turns is secured by overlapping the ends of the tape or by cementing the cord in order to prevent any tendency of the latter to unwind and to prevent the turns thereof from slipping upon each other. The unit is pressed fully to flatten the side walls of the channel backing ring and the cord is severed. In a subsequent operation, side grooves, as hereinafter illustrated, may be pressed in the sides of the ring. The resultant unit may then be considered as complete and can be used for various brushing operations without further treatment. However, if preferred, they can be sprayed with or dipped in a suitable solution of a medium designed to improve tack or stiffness of the fill material.

For a better understanding of the invention, reference may now be had to the accompanying drawings in which like numerals refer to like parts throughout, and in which.

Figure 1:
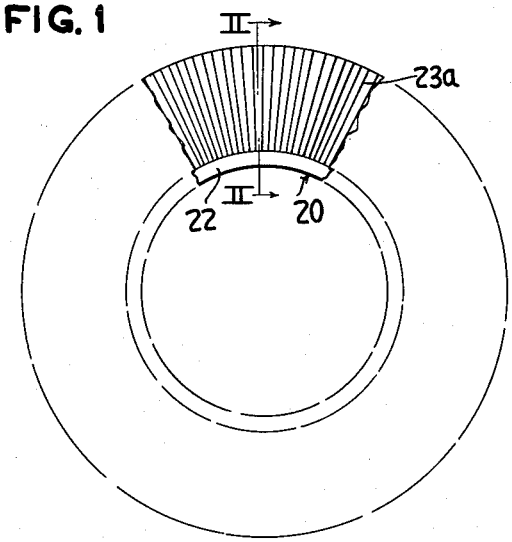
FIGURE 1 is a side view of a brush section constructed in accordance with the provisions of this invention.
Figure 2:
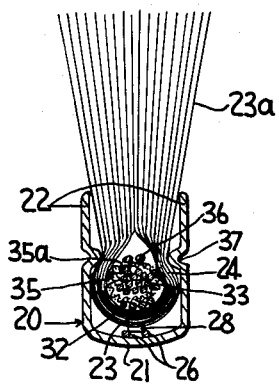
FIGURE 2 is a sectional view on an enlarged scale taken substantially along the line II—II in FIGURE 1.

In FIGURES 1 and 2 is shown a flat, annulus-like brush section comprising a channel form backing ring 20 having a bottom 21 adapted to seat upon an appropriate adaptor structure upon a mandrel or arbor, and interconnecting side walls 22. Within the channel backing ring are disposed the bight portions 23 of filaments of double length fill material 23a, the ends of which project radially outwardly in conventional manner.

The fill material may be of Tampico fibers, horsehair, fibers of synthetic plastics, such as Nylon, polypropylene, steel wire, brass wire, fiber glass, or other filamentary materials useful in the fabrication of rotary power-driven brushes. Strips of cloth woven of cotton threads or threads of fiber glass, or a mixture of the two types of fibers, may also be used as a fill material to form a buffer construction.

The prestressed core structure 24 holding the fill material in the channel backing ring preferably is formed of a number of turns of a synthetic plastic cord. The cords may be monofilaments or a multiplicity of small fibers in the form of a roving bonded together with a flexible, extensible plastic or may comprise a multiplicity of yarns or threads, either bonded or unbonded, but being spun or braided into a cord of suitable diameter and strength. Braided cords are presently preferred because of their high tensile strength, flexibility and elasticity. The cords, of necessity, must be of high tensile strength and it is also desirable that they have a considerable degree of mechanical stretch or elasticity so that they can be substantially elongated under tension and will return to their initial length, or nearly to their initial length, if the tension is relaxed. Those cords formed of a polyamide of a plyamine and a polycarboxylic acid, and being represented by stretch oriented nylon cords, excellently fulfill the requirements. The polyamide resins of this type have good strength and a relatively considerable degree of elasticity. When the cords of this type are tightly wound to provide a core comprising several turns bundled together, there is a high degree of friction between the turns that greatly reduces the tendency of the turns to slip upon each other. Also, the fibers of fill material in contact with the outer turns actually indent the cord and thus further assist in preventing slippage. It will be apparent that cords of other plastics of similar properties may also be substituted for the polyamine-polycarboxylic acid polyamide resins, if desired. The polyamide resins, in addition to a high degree of strength and elasticity, are also relatively inert with respect to most solvents, water and agencies of corrosion, such as acids, salts and the like, which may be used in various scrubbing operations.

Figure 5:
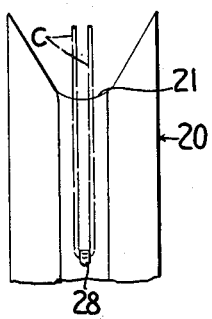
FIGURE 5 is a fragmentary view in partial section of the semi-formed channel backing ring with the preliminary turn or turns of core-forming cord being wound thereupon.
Figure 3:
FIGURE 3 is a fragmentary view on a larger scale of a knot joining the ends of two cords used in winding the core for the unit, thus forming a loop adapted to be hooked under a tab provided in a semi-formed channel backing ring.

As will be apparent from FIGURE 5 of the drawings, the core of the brush section is formed of two distinct but parallel strands of cord. These may be concurrently drawn from two distinct sources of supply, such as separate spools. The cords or strands initially are applied, as at 26, directly to the bottom 21 of the channel backing ring. Such application may be by means of an adhesive separately applied to the channel or to the cord, or to both. The ends may also be held down in the channel by adhesive tape. Likewise, the ends of the cords may be secured together by clips of flat metal or by wires to provide a loop that will hold the ends together. However, it is presently preferred to unite the ends of the two cords as indicated by the knot 27 shown in the detailed view in FIGURE 3. Union of the two ends of the cord may also be effected by fusing them together or by clamping them together, or by other appropriate systems. The loop thus formed by uniting the two ends may be conveniently thrown over a tab 28 (see FIGURES 4 and 5) which is indicated as being integral with the semi-formed channel backing ring, but may also be affixed to the bottom of the channel backing ring as by soldering, brazing or welding. One or more turns of the two cords thus secured to the bottom of the channel, as shown in FIGURE 2, are wound under the bight portions 23 of the fill material, thus providing the first layer 26 and forming a pair of parallel but somewhat yieldable ridges on the bottom of the channel. These ridges are firmly engaged by the contiguous bight portions and this engagement assists in holding the fill material from peripheral creeping or migration as the brush section is rotated in contact with an article which is being brushed.

The bights of the fill material are firmly constricted against the bottom of the channel and the bottom layer 26 of the strands of cord by intermediate winding layer 32 of cord, which may comprise one or more complete turns as a continuation of the layer 26. The intermediate layer 32 is under strong tension, assisting in exerting constrictive pressure on the bights of the fill material in the channel.

The main body of the core is made up of a layer 33 comprising a considerable number, e.g., four or more, complete turns of the two cords, which are also a continuation of the cords forming the layer 32. All of these turns of cord, and more especially the turns in the layer 33, are substantially tensioned or prestressed, thus placing a considerable degree of elastic stretch on the cord. The tension generated by the stretch holds the bights of the fill material firmly against the layer 26 and the packing of the fill material in the channel in service does not sensibly reduce the constrictive force. The degree of tension applied to the cord turns naturally must be below the tensile strength thereof, but should be sufficient to stretch or elongate the cords quite materially, for example, about 5 percent to about 40 percent of the total length.

Various means may be employed to maintain the tension on the turns of the cords in the several layers. They may be precoated with a cement which is set up in the finished brush section to hold the turns securely together, as for example, the cords as they are wound may receive coatings of a liquid cement that will rapidly set or cure firmly to bond the several turns together under tension. Cement may also be applied as a jet or stream, or by brushing to the turns as they are applied, or to the cords forming the core after they have all been wound into place upon the fill material. The application of cement is an added feature which is not usually required.

A preferred fastening for the turns of the cords, and notably those turns in the layer 33, is illustrated as comprising tie strip or band 34. This may be a band or strip, such as friction tape, having overlapped ends held together by a pressure-sensitive or other suitable form of adhesive. As shown, however, it is formed of a bendable or crimpable metal, such as a small strip of iron, steel, brass, aluminum, or the like, which retains its grip by reason of its inherent stiffness. This strip may be smooth or may be roughened, as by perforations or by ridges or other indentations, giving it a firmer grip upon the turns of the cord. The strip, even though of metal, may also be coated with a suitable adhesive or cement which will set more firmly to hold it in place when crimped about the layer of cord 33. Cementing, however, is not usually required in order to effect adequately firm holding action.

Preferred material for forming the tie strip presently comprises wire fabric such as is used in insect screens. This material has excellent grip and can readily be bent about the layer 33 in order to clamp the turns thereof from slippage in the bundle.

It will be observed that the mid-portion of the tie strip extends under the layer 33 and the outwardly projecting edge portions are lapped over upon each other, as indicated at 35. This overlapping assists in holding the turns of cord in place. The ends of the wires may also be bent, as at 35a, to obtain a hooking effect when the ends of the strip are crimped. The individual wires in the strip do indent the plastic cord and thus reduce any tendency for the tensioned cords in the finished brush section to slip on each other. The indenting action is enhanced when the side walls 22 are pressed into parallelism in the manner to be described. The wire cloth or screen, while holding the turns very effectively, has a minimum tendency to cut or chafe the fill material with which it comes in contact.

One or a plurality of strips appropriately spaced may be used. The strip may also be formed of a tape extending entirely around the perimeter of the core structure and having its edge folded over upon the cord, as at 35.

Means further to press down the edge portions 35 of the strip 34 comprises a top layer 36 of cord containing one, two or more turns of cord wound under tension over the top of the strip in such manner as to more firmly press down the overlapping edges 35 and to engage the hooked ends 35a (if they are present) with the meshes of the contiguous layers. The top turns may be retained permanently, being held down by appropriate means, such as a small amount of cement, or they may also be applied for crimping purposes only in the forming of the brush following the techniques hereinafter described. In the latter event, they may be unwound at the conclusion of the assembly operation and cut near the folded strip.

Means further to grip the fill material and the core structure to retain them in the channel comprises one or more circumferentially extending grooves 37 pressed in the sides 22 of the channel backing ring. These grooves form ridges within the channel backing ring which compress the doubled fill material and hold it more securely. As shown, they are disposed outwardly of the bundle of cord forming the core. They, therefore, provide a throat or restriction which positively keys the core and the bight portions of the fill material within the channel to prevent or reduce the possibility of the latter being thrown outwardly, in the unlikely event that the cord should be broken, or the turns thereof should slip under high tension generated by high speed rotation of the brush section. It will be understood that instead of forming continuous channels 37, a series of indentations or dimples may be pressed around the sides of the channels. These project into the mass of fill material within the channel and reduce any tendency of the fill material peripherally to migrate when the brush section is heavily loaded in a brushing operation.

The several stages involved in the assembly of the foregoing brush section are illustrated diagrammatically in FIGURES 3 through 16. The first operation in such assembly preferably involves the tying together of the contiguous ends of the two strands C of cord as by the knot 27. The loop thus formed, as shown in FIGURE 5, is hooked under the tab 28, which is formed as an extension of the outer of the overlapped ends of the semi-formed channel backing ring 20. This ring, at this stage, has outwardly flared edge portions, giving it a V-like section. The two ends of the ring, where they overlap, are secured together by spot welding, by brazing, or other appropriate techniques as will be well understood by those skilled in the art. Appropriate apparatus for forming these units will subsequently be described. When the loop formed by the cords C has been secured in place under the tab 28, one or more turns are wound directly upon the bottom 21 of the semi-formed backing ring, thus securely anchoring the cord against any reasonable tensional force and providing the cushioning layer 26 upon the bottom of the channel in the manner already described. The assembly at the conclusion of this stage of the operation, is illustrated diagrammatically in FIGURE 6, wherein the preliminary layer of cord 26 is shown in place, ready for the subsequent application of the fill material transversely over the top edges of ring 20.

Figure 6:
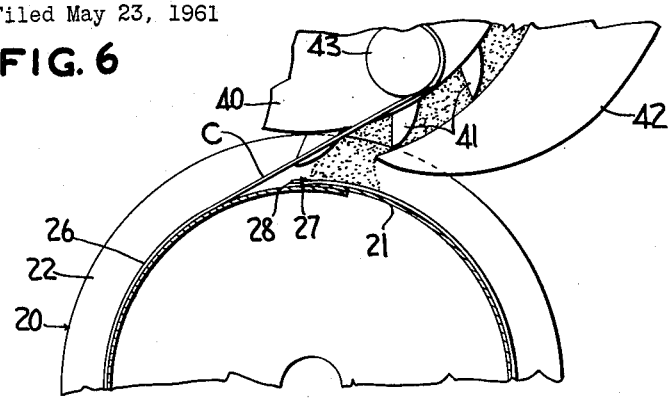
FIGURE 6 is a fragmentary view in partial section showing the semi-formed channel backing ring with the preliminary turn or turns of core cord wound thereupon, said ring being ready at this stage to receive a layer of fill material disposed transversely of said ring.
Figure 7:
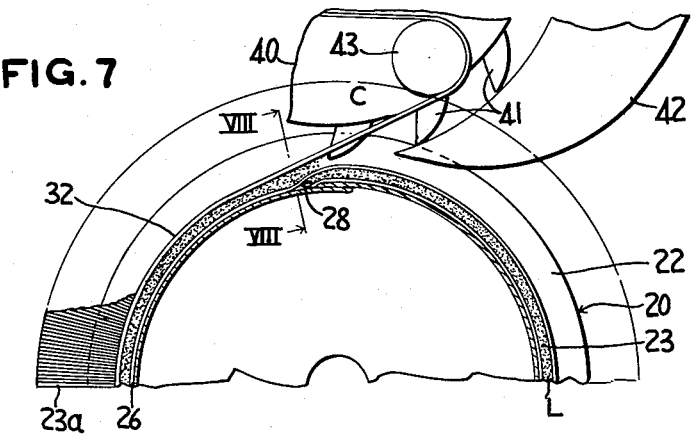
FIGURE 7 is a fragmentary sectional view of a semi-formed channel backing ring having a transverse layer of fill material deposited thereabout and being held in place by one or more windings of cord disposed around the outer perimeter thereof.
Figure 8:
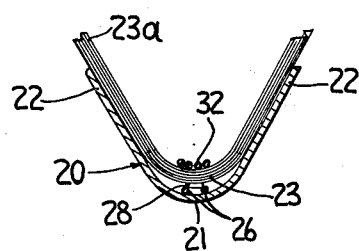
FIGURE 8 is a sectional view taken substantially upon the line VIII—VIII of FIGURE 7.
Figure 9:
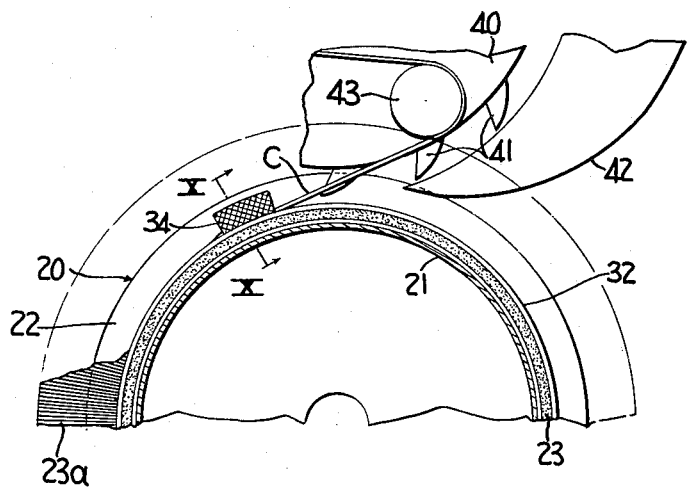
FIGURE 9 is a sectional view showing a channel backing ring having the fill material disposed in place and with a bendable tape element in place to receive the main windings of cord to form the core of the construction.

Means to supply the fill material 23a as a layer of appropriate thickness and uniformity comprises rotary power-driven picker disc or wheel 40 having saw-like teeth 41 about the outer perimeter thereof and providing spaces within which the fill material is disposed as it is carried to the semi-formed channel backing ring 20. A crescent-like plate 42 held by a fixed bracket 42a in contiguity at its inner perimeter with the teeth, assists in holding the fill material while it is being transported to position. As shown in FIGURE 6, the fill material, after passing the tip of the crescent member 42, is deposited as a layer L across the outer edges of the side walls 22 of ring 20 and is immediately bound under the cords as they are being wound upon the channel backing ring. A separate strand of cord preferably is supplied on each side of the picker disc and is guided into position in the channel of ring 20 by means of guide rollers or discs 43. This facilitates symmetrical winding of the core structure. The channel backing ring is continuously rotated to wind the strands of cord into position and to distribute the fill material in place. The guide rollers 43 are placed well back so that the fill material is caught by the cords essentially as soon as it clears the tip of the crescent member 42. The cord effectively presses the fill material in place between the flared sides 22 of the ring 20, sufficient tension being exerted to assure that the fill material is securely held during subsequent operations. Usually, a single revolution of ring 20 is sufficient to allow deposition of an adequate amount of fill material in place transversely of said ring. However, if desired, two or more complete revolutions may be made to deposit added layers of fill material. All of the turns are appropriately held in place by the cord. After a sufficient amount of fill material has been disposed transversely about the ring, the feed of fill material is discontinued while the ring is rotated an appropriate number of times, e.g., two times, in order to provide the intermediate layer of turns 32. The state of the assembly at the conclusion of the latter operation is shown in FIGURES 7 and 8.

Figure 10:
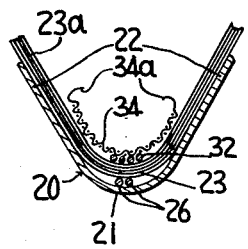
FIGURE 10 is a sectional view taken substantially upon the line X—X of FIGURE 9.

The next stage or operation (shown in FIGURES 9 and 10) comprises the insertion of the tie strip 34 which at this stage is open or uncrimped and is of sufficient width so that the edges thereof engage the fill material. The bottom of the bight formed in the strip is pressed downwardly, as indicated in FIGURE 10, against said layer 32.

Figure 11:
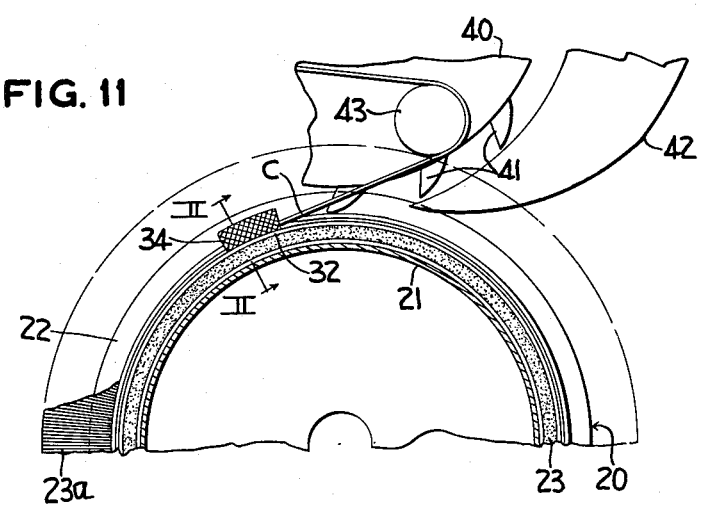
FIGURE 11 is a fragmentary sectional view showing the main wrappings of cord wound in place upon the holding tape element used to hold the turns of cord in place.
Figure 12:
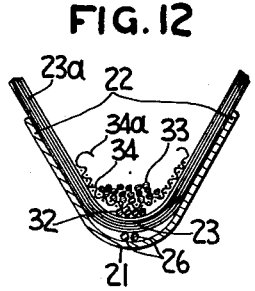
FIGURE 12 is a sectional view taken substantially at the plane of line XII—XII in FIGURE 11.

The next stage is illustrated in FIGURES 11 and 12 and comprises the application of a number of turns of cord upon the outer perimeter of the fill material and over the bight of the strip 34 to provide the main body 33 of the core structure. The number of turns of cord so applied is subject to variation dependent upon the strength of the individual cords and the ultimate strength desired in the core structure. Usually, from four to twelve complete turns are sufficient for this purpose; however, the number may be varied.

Figure 13:
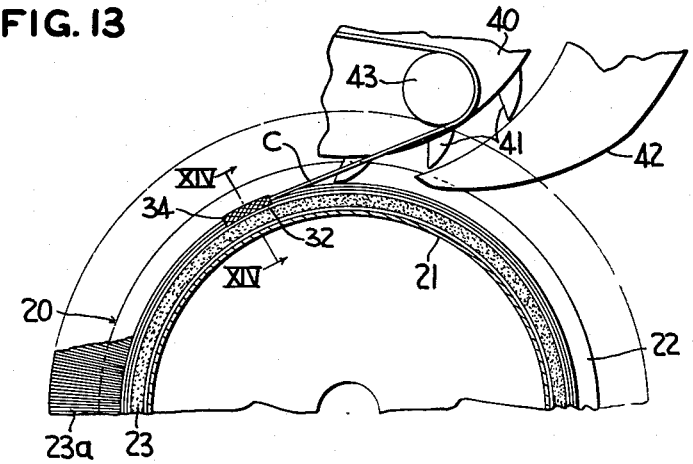
FIGURE 13 is a fragmentary sectional view showing the bendable holding tape crimped about the main winding of the cord forming the core structure of the unit.
Figure 14:
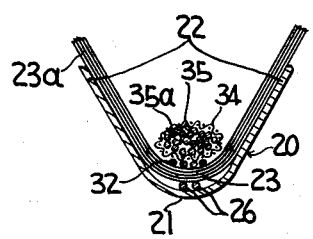
FIGURE 14 is a sectional view taken substantially upon the line XIV—XIV of FIGURE 13.
Figure 15:
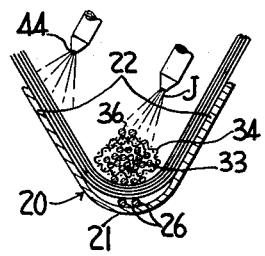
FIGURE 15 is a fragmentary sectional view of a semi-formed channel backing ring showing an optional added winding of cord assisting in crimping the bendable tape element about the main winding.

The next operation, as illustrated in FIGURES 13 and 14, comprises folding over or crimping the outer edges 35 of the strip element 34 in such manner as to provide a band gripping the cords of the layer 33 into a compact ring, and to prevent unwinding of the turns of cord after they have been severed. To facilitate the crimping or doubling over of the edges of the strip 34, a further layer usually comprising a single turn of the two cords, indicated at 36, is wound upon the core as indicated in FIGURE 15. Usually, the cord turns are adequately held by the tape 34, but it is also quite feasible further to hold them from slippage by prewetting the cord with a pressure-sensitive adhesive, or a thermosetting cement or glue, such as an epoxy resin, glue or the like. A jet J of cement may also be applied over the turns of cord while the sides of ring 20 are still open. At this stage, while the bristles on one side are held apart from those on the other, it is feasible to sprinkle the faces of the two layers of bristles with a solution of a tacky, non-drying oil composition. Such operation is indicated at 44.

Figure 18:
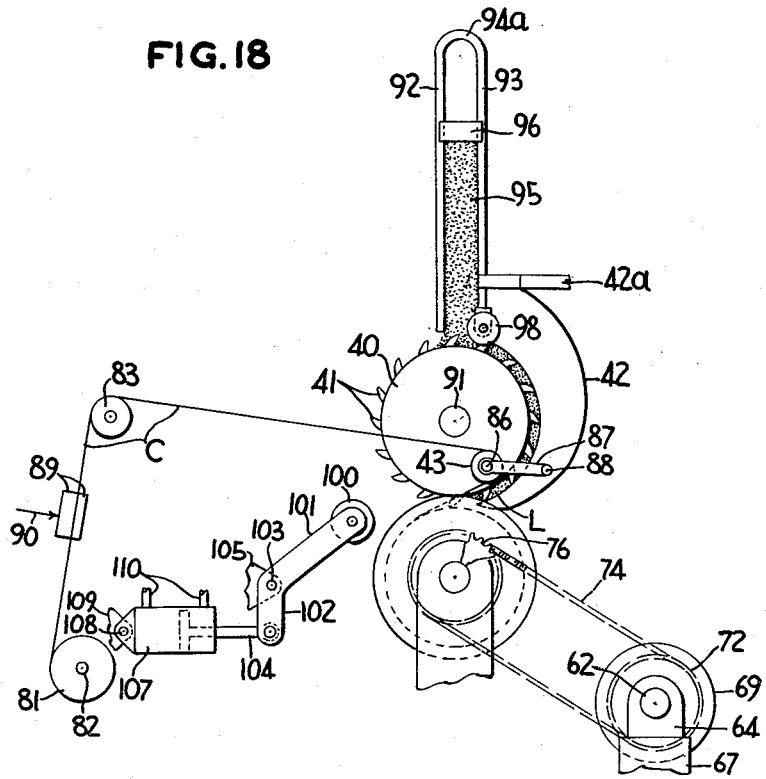
FIGURES 18 and 19 are diagrammatical views illustrating essential portions of one embodiment of apparatus sed in forming the brush units.
Figure 19:
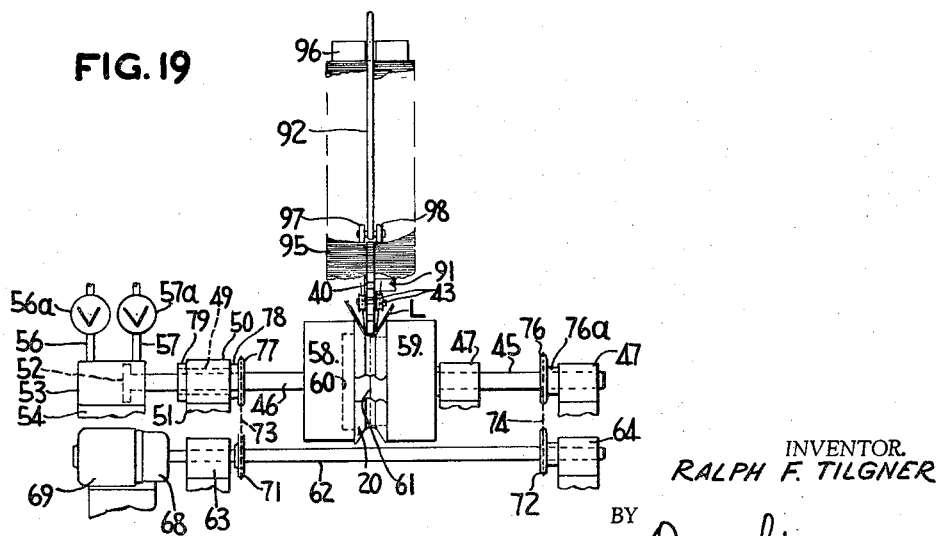

Apparatus used in performing the several operations illustrated in FIGURES 3 through 15 is shown diagrammatically in FIGURES 18 and 19. This apparatus comprises a pair of longitudinally reciprocable but rotatable shafts 45 and 46 which are also longitudinally spaced but coaxially aligned. The first of these shafts rotates in a bearing, such as a pedestal bearing 47, on any convenient support or framework 48, while the second is splined to reciprocate in a sleeve 49 that rotates in a pedestal bearing 50 on a support 51, which may be a part of a framework common to the support 48. Shaft 46 is provided with a piston head 52 in a double-acting cylinder 53 which may be supported in any convenient manner, as by a column 54, which may be only a part of a common framework (not shown). Conduits 56 and 57 provide means for introducing actuating fluid under compression to the cylinder in order to reciprocate the piston. Valves 56a and 57a provide means for controlling admission of fluid to the cylinder.

The contiguous but spaced ends of the shafts 45 and 46 are provided with heads 58 and 59, the latter of which, upon its face, is provided with a shoulder 61 which is adapted to seat a semi-formed ring 20 for rotation during the application of fill material and the turns of the cord forming the core element of the brush section. To hold the channel backing ring in place upon the shoulder, the head 58 may be pressed lightly against the contiguous side of the ring. Part of ring 20 is shown as being broken to show shoulder 61. Head 58 may also be bored, as at 60, to provide space to receive shoulder 61 when the section is being pressed to disc or annulus shape, as subsequently described.

Means to rotate the two shafts 45 and 46 in unison comprises a jack shaft 62 mounted to rotate in pedestal bearings 63 and 64 upon the supports 66 and 67, and being connected to a speed reducing mechanism 68 driven in turn by motor 69. The jack shaft 62 is provided with a pair of spaced sprockets 71 and 72 keyed thereupon and having sprocket chains 73 and 74 trained thereabout. These chains are further trained about sprocket wheels 76 and 77, having hubs 76a and 78, the first of which is keyed upon shaft 45 and the second of which is rigidly affixed as by set screws or by keys (not shown) upon the sleeve 49 in which the shaft 46, as already mentioned, is splined. Hub 78 of the sprocket 77 holds the latter in spaced relationship to the side of the bearing, and a collar or shoulder 79 on the sleeve 49 prevents longitudinal displacement of the latter in the bearing 50 when the shaft 46 is reciprocated by the piston 52. The sprockets 71 and 72 are thus maintained in a common plane for efficient operation at all times, regardless of the position of the piston 52 in the cylinder 53.

A pair of cords C, of which the several turns have already been described for forming the core of a brush section, is supplied to the semi-formed channel backing ring 20 by a pair of spools 81 (one of which is shown) rotating upon a common shaft 82. The two cords can be trained over any convenient set of guide pulleys for feeding them to the semi-formed channel ring 20. For purposes of illustration, an upper pulley 83 is shown as feeding to roller 43, provided for each of the two cords. A roller 43 is placed upon each side of the picker disc 40 so that the constrictive forces of the cords on the fill material are balanced and the latter is pressed evenly into the V-like channel of the semi-formed channel ring 20. The rollers 43 may be supported in any convenient manner, as for example, by appropriate frame elements. For purposes of illustration, the rollers 43 are shown as being journaled upon pins 86 on arms 87 clamped by bolts 88 to the crescent-shaped plates 42, already described for retaining the fill material about the outer perimeter of the picker disc. As already pointed out, rollers 43 are placed so that the cords engage the fill material as it leaves the tip of plate 42, or very soon thereafter.

Means to apply a predetermined tension to the cords C as they travel toward the channel of ring 20 comprises an opposed pair of friction plates 89, which are resiliently urged toward each other (by means not shown) for exerting a force, indicated vectorially at 90. By increasing or decreasing the pressure between the plates 89, the tension of the cord as it is wound in the channel of ring 20 can be varied. Obviously, other friction devices could be used for this purpose if so desired.

Means to feed layer L of fill material to the ring 20 has already been in part described in connection with certain of the operations involved in the process of assembling the brush section. This apparatus will now be more completely described. It comprises the rotary picker disc 40 with teeth 41 and coacting with crescent-shaped plate 42 to transport the fill material to the ring. The disc is supported and rotated by shaft 91, which in turn is driven by motor means (not shown). It is desirable that the shaft be supplied with power, the application of which can be discontinued optionally during the several operations involved in forming the brush. For example, it will be obvious that after the fill material has been laid down across ring 20, it is desirable that the rotation of the picker disc be discontinued while the several operations in winding on the cord C and securing the same by the strip 34 are performed. This effect can be attained by starting and stopping the motor, or by provision of a clutch between the motor and the disc that can be disengaged when feeding of fill material is to be interrupted.

Guide rods 92 and 93 on a fixed bracket 42a extend upwardly above the picker disc and are interconnected at their tops, as indicated at 94a, to provide a magazine for a column 95 of ordered and parallel filaments constituting the fill material. The fill material is pressed downwardly between the rods by suitable means, such as a weight 96 guided by the rods 92 and 93, and rests at its lower end upon the edge of the picker disc 40. When the disc rotates, the fill material is drawn from the bottom of the column in layer L of substantially uniform thickness by the teeth 41 and deposited across ring 20. The presser rolls 97 and 98 at the lower extremities of guide rods 92 and 93 help to distribute the stock uniformly upon the perimeter of the picker disc.

In the operation of the apparatus, the fill material is deposited by the picker disc across the edges of the sides of the ring 20 as the two heads 58 and 59 carrying the ring are rotated by the drive motor 69. The fill material, as it is contacted with the edges of the ring 20, is engaged at once by the cord C from the guide rollers 43 so that the mid-portions thereof are pressed, even as they are being released from teeth 41 into the V-like channel of the ring. Thus, no opportunity is afforded for the stock to be disarranged or displaced before it is gripped firmly into the V-channel by the cord.

Means to press the fill material, the turns of cord and the edges 35 of the strip 34, already described into the V-channel, comprises a presser roller 100 mounted upon the end of a lever 101 having a rigid arm 102 and being pivoted upon a shaft 103 rotating in an appropriate fixed bearing 105. The arm is attached at its free end to a piston rod 104 equipped with a piston head 106 which reciprocates in double-acting air cylinder 107. The cylinder in turn is pivoted at its rear end, as at 108, to a fixed bracket 109 so that when the piston head is reciprocated, the arm 102 is swung forwardly and downwardly to cause the roller 100 to engage the material within the channel backing ring. The movements of the piston may be controlled by valves (not shown) in pressure lines 110. The valves may be operated manually or automatically.

The several process stages of the winding operation have already been described. Since these in effect correspond to the mode of operation of the apparatus diagrammatically shown in FIGURES 18 and 19, further description thereof is not considered to be necessary at this time.

If desired, the head 58, actuated by piston head 52, can be employed as a press for planarizing the sides of the brush unit after the latter has been assembled. This is accomplished by reciprocating the piston to force the head 58 strongly against the side of the ring 20, thus forcing the two sides into parallelism and firmly gripping the fill material and the cords forming the core within the channel.

Figure 16:
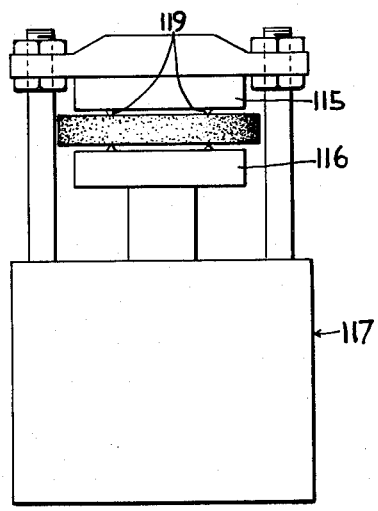
FIGURE 16 is a diagrammatical view illustrating the pressing operation to which the assembled brush is subjected in order to planarize the semi-formed channel backing ring.

If desired, the pressing operation may also be performed partially or completely by a separate press, as indicated in FIGURE 16. The apparatus as shown in the latter figure comprises dies 115 and 116 disposed in a hydraulic press 117 of conventional design. The dies are provided with circular ridges 119 which engage the sides of the channel backing ring, whereby to press the circumferentially extending grooves 37 into the latter. These grooves, as previously explained, provide a restricted throat which compresses the fill material firmly and also assists in preventing the outward displacement of the core structure together with the looped portion of the fill material disposed about the core structure in event that the brush is subjected to excessive strain.

Figure 4:
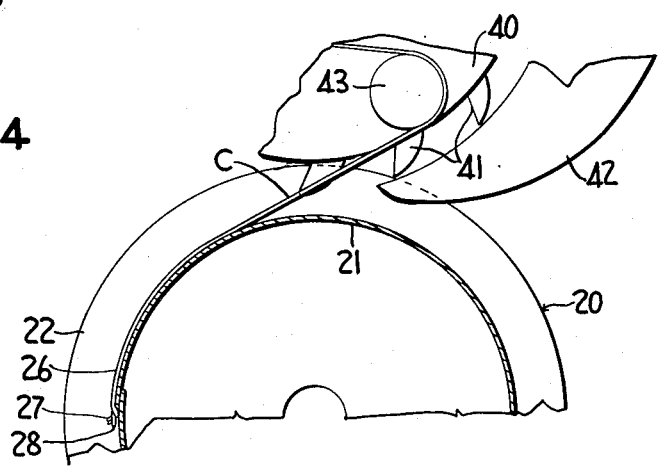
FIGURE 4 is a fragmentary view showing the looped ends of the cords disclosed in FIGURE 3 as being attached to the semi-formed channel backing ring, as in an early stage of forming a brush unit.
Figure 20:
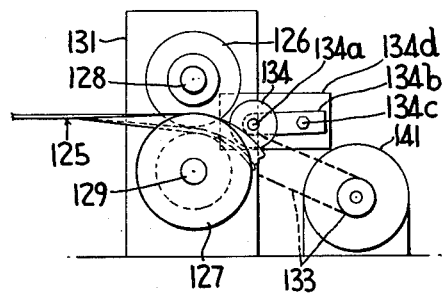
FIGURE 20 is an end elevational view of apparatus suitable for use in forming spiral turns of a strip of metal, such as iron or steel, to V-shape and cutting of units thereof in forming the channel backing ring of a brush section.

The fabrication of the rings of V-section and constituting the semi-finished backing channels, is considered within itself to involve a novel and patentable process. Although other processes could be used in the preliminary formation of such units, that disclosed is highly efficient and therefore will be described in brief. In the process, a ribbon 125 of sheet metal is rolled to a V-channel section and is concurrently wound to provide a helical channel wherein the sides of the channel diverge outwardly. The turns of the helix are then severed one at a time, the ends of the turns are overlapped and spot welded together to provide the semi-formed rings, as illustrated in FIGURES 4, 5, 6 and others. The process and apparatus employed in forming the semi-formed channel backing rings are illustrated diagrammatically in FIGURES 20, 21 and 22, wherein as shown, the tape or ribbon 125 of mild steel, aluminum, or the like is passed between a pair of male and female V-rollers 126 and 127 keyed upon shafts 128 and 129 projecting from the speed reducer 131. The latter is driven by shaft 132 having any convenient drive, such as a sprocket and chain drive 133 from motor 140. The tape in passing between the rollers 126 and 127 is formed to V-section and is appropriately circularized to appropriate diameter as it emerges from between the rollers by means of bending roller 134 journaled upon a pin 134a on an arm 134b rigidly but adjustably mounted upon bolt 134c on bracket 134d of the housing of the speed reducer 131. It is also given a helical pitch, a by guide blocks or shoes 135. Only a few turns of the helix are formed and as the latter progresses, the end turns are severed, as by reciprocating die 136 in a cutter head 137. The die coacts with a lower die or shear 138 in punch press 139. The die is driven by motor 141.

Figure 21:
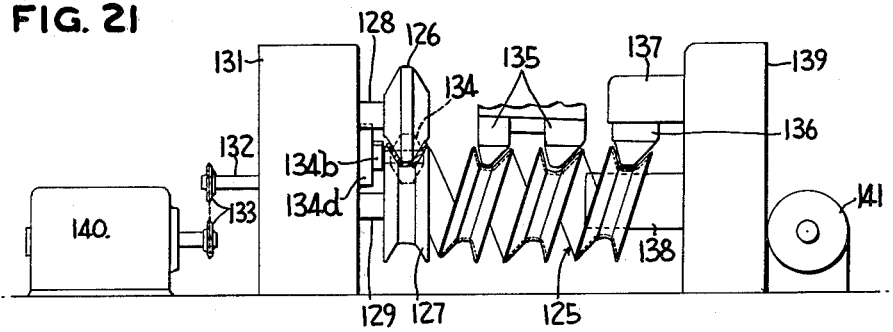
FIGURE 21 is a side elevational view of the apparatus shown in FIGURE 20.
Figure 22:
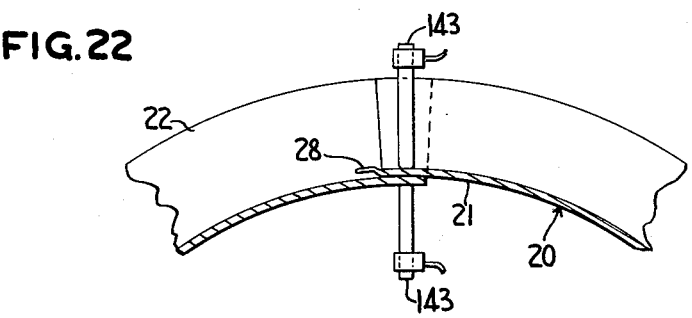
FIGURE 22 is a diagrammatical view showing the welding of the severed ends of a turn of the V-channel strip to provide channel backing rings.

The severed ends of a turn are overlapped, as shown in FIGURE 21, and are spot welded together, as by electrodes 143, two of which are diagrammatically indicated in the drawing.

Figure 17:
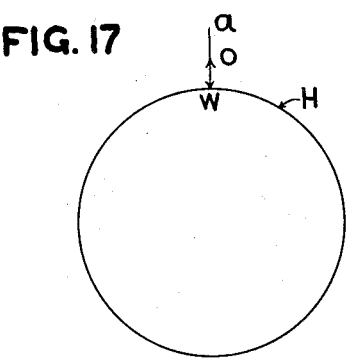
FIGURE 17 is a diagrammatical view illustrating the mode in which the constrictive forces and tensional forces interact against each other in the operation of a brush unit.

In FIGURE 17 of the drawings is illustrated the manner in which the centrifugal force of the fill material and the turns of the cord constituting the core are opposed by the constrictive forces set up by the stretching of the cord. In the figure, the tensioned core element is represented by the circle H. The restrictive component of the tension force urging the fill material radially inwardly against the bottom of the channel is represented by the vector $aw$. This force is opposed by centrifugal force, represented by the vector $ow$. So long as $ow$ remains less than $oa$, the fill material will be gripped against the bottom of the channel backing ring. As the press unit is speeded up, the force $ow$ will increase and ultimately, the high speeds $ow$ may exceed $ao$. The diameter of the cord turns will then increase as the speed is further increased, allowing the loops of the fill material to move outwardly away from the bottom of the channel. However, if the cord is adequately pre-tensioned and of adequate strength, rotational speeds may be relatively high before the fill material thus tends to be displaced radially outwardly in the channel. It will be apparent that so long as the force $ow$ is not greater than the force $ao$, the tension on the cord is not increased by increase of rotational speed of the unit, except by the centrifugal force created by the spinning of the core itself. Usually, the latter force is relatively small.

Although specific examples of the invention have been set forth hereinabove, it is not intended that the invention be limited solely thereto, but to include all of the variations and modifications falling within the scope of the appended claims.

I claim:
1. The method of forming a filled rotary brush section which comprises attaching the end of a cord, which is of synthetic elastomeric plastic, to the bottom of a monolithic bendable sheet metal channel backing ring of V-shaped cross-section, laying the fill material across the edges of the ring while rotating the ring to distribute the fill material as a relatively uniform layer around the perimeter thereof and then to wind a plurality of consecutive turns of the cord under tension elastically stretching the cord about 5 percent to about 40 percent around the mid-portions of the fill material to provide a circular band of stretched turns constricting the fill material within the channel, securing the turns together in a bundle by means acting transversely of the cord in said turns to prevent slippage of the turns upon themselves, and then subsequently axially pressing the resultant assembly to bend the side walls of the channel backing ring substantially into parallelism and to double the fill material about the cord, and to compact the mid-portions of the fill material about the turns of the cord within the bight portions of said fill material, the channel backing ring being left permanently in place in order to provide a brush section.

2. The method of claim 1 wherein the cord is nylon.

3. A rotary brush section comprising a monolithic channel backing ring having substantially parallel sides and having doubled fill material disposed therein, and a band of a cord of elastomeric synthetic plastic material disposed in the bight portions of the doubled fill material and being secured at its end in the channel backing ring and extending through the layer of fill material and further comprising a plurality of consecutive turns around the fill material, the cord being stretched about 5 percent to about 40 percent and means transversely securing a plurality of the turns of the cord together in a bundle and holding them in place.

4. A rotary brush section comprising a monolithic channel backing ring having substantially parallel sides and doubled fill material disposed therein, and a core in the form of an elastomerically stretched band disposed in the bight portion of the doubled fill material and comprising a cord of elastomeric synthetic plastic material secured at its end to the channel backing ring and extending through the layer of fill material, and comprising a plurality of consecutive turns around the fill material in the bights thereof, the cord being stretched about 5 percent to 40 percent and means transversely securing a plurality of the turns of the cord together in a bundle and holding them in place, the bight of the fill material and the turns of elastomeric cord disposed in said bight being tightly compressed between the sides of the channel backing element.

5. A rotary brush section comprising a monolithic sheet metal channel backing ring having substantially parallel sides and a hook-like lug in the bottom thereof, and doubled fill material disposed in the channel backing element and a core in the form of an elastomerically stretched band disposed in the bight portion of the doubled fill material and comprising a cord of elastomeric synthetic material secured at its inner end to the lug in the channel backing ring and extending through the layer of fill material and comprising a plurality of consecutive turns around the fill material in the bights thereof, the cord being stretched about 5 percent to 40 percent, and means transversely securing a plurality of the turns of the cord together in a bundle and holding them in place, the bights of the fill material and the turns of the cord disposed therein being tightly compressed between the sides of the channel backing element.

6. A rotary brush section comprising a monolithic channel backing ring of bendable sheet metal having substantially parallel sides and having a hook therewithin and being attached to the bottom thereof and doubled fill material disposed in the channel backing element, and a core in the form of an elastomerically stretched band disposed in the bight portion of the doubled fill material and comprising a cord of elastomeric synthetic plastic material having a loop thrown over said hook and extending through the layer of fill material, and comprising a plurality of consecutive turns around the fill material in the bights thereof, the cord being stretched about 5 percent to 40 percent, and means transversely securing a plurality of the turns of the cord together in a bundle and holding them in place, the bights of the fill material and the turns of elastomeric cord disposed therein being tightly compressed between the sides of the channel backing element.

7. A rotary brush section comprising a monolithic channel backing ring having substantially parallel sides and doubled fill material disposed in said ring, and a core in the form of an elastomerically stretched band disposed in the bight portion of the doubled fill material and comprising a cord of elastomeric synthetic plastic material secured at its inner end in the channel backing ring and extending through the layer of fill material and comprising a plurality of consecutive turns around the bights of the fill material, the cord being stretched about 5 percent to about 40 percent and means transversely securing a plurality of the turns of the cord together in a bundle and holding them in place, the latter means comprising a tape of metal extending under the bundle of cord and being folded over the top thereof.

8. A rotary brush section comprising a monolithic channel backing ring having substantially parallel sides and doubled fill material disposed in the channel backing ring, and a core in the form of an elastomerically stretched band disposed in the bight portions of the doubled fill material and comprising a cord of elastomeric synthetic plastic material secured at the inner end in the channel backing ring and extending through the layer of fill material, and a plurality of consecutive turns of the cord around the fill material, the cord being stretched about 5 percent to about 40 percent, and a tape of wire cloth transversely securing a plurality of the turns of the cord together in a bundle and being crimped over the top of the bundle of cord.

9. The method of forming a filled rotary brush section which comprises attaching the end of a braided nylon cord to the bight of a sheet metal ring of V-shaped cross-section, laying filler material across the edges of the ring while rotating the ring to distribute the filler material as a relatively uniform layer around the perimeter thereof, and to wind a plurality of consecutive turns of the nylon cord under tension elastically stretching the cord about 5 percent to about 40 percent around the mid-portions of the fill material, thus forming a core constricting the fill material within the channel of the ring, and then axially pressing the resultant assembly to press the side walls of the ring into substantial parallelism and to double the fill material about the core, whereby to compact into a dense mass the fill material and the turns of the cord within the bight portion formed by doubling of the fill material.

10. A rotary brush section comprising a channel backing ring having substantially parallel sides and doubled fill material disposed in the channel backing ring, and a core of nylon cord disposed in the bight portions of the doubled fill material, the end of the cord being secured to the bottom of the channel backing ring and the cord extending through the fill material and being wrapped around the fill material in a plurality of turns under tension the cord being stretched about 5 percent to about 40 percent and means transversely securing the turns together in a bundle and holding the last turn in place.

11. A rotary brush section comprising a channel backing ring having substantially parallel sides and doubled fill material disposed in the channel backing ring, and a core of nylon cord being stretched about 5 percent to about 40 percent disposed in the bight portions of the doubled fill material and comprising a plurality of contacting turns, the inner end of the cord being secured to the bottom of the channel backing ring and the bundle of cord being secured together by means of a tape of wire cloth extending under and overlapping the top of the bundle, the tape, the bight portions of the fill material and the turns of cord being under compression exerted by the side walls of the channel backing ring, whereby the turns of the cord are held from slippage within the bundle.

12. A rotary brush section comprising a channel backing ring having substantially parallel sides and doubled fill material disposed in the channel backing ring, and a core composed of turns of a pair of parallel cords of elastomeric material being stretched about 5 percent to about 40 percent and having their ends secured together and being secured to the bottom of the ring by looping over a lug formed integrally therewith, the cord extending through the layer of fill material and being wrapped in a plurality of turns about the layer of fill material, and means for securing the turns of the bundle from slippage upon each other and comprising a tape extending under the bundle of turns of fill material and being overlapped upon the top of the fill material.

13. A method of forming brush sections which comprises forming channel rings having outwardly divergent sides by passing a flat metallic tape of requisite width between a male roller and a female roller having surface contours corresponding to the desired section of the ring, and winding the tape as it is shaped, into a helix of a diameter approximating that of the rings and in which the channel faces outwardly, cutting the helix into lengths corresponding to the perimeter of the rings being formed, welding the ends of the lengths together to provide continuous rings, securing a cord of elastomeric material to the bottom of the channels, laying double-ended fill material in a layer across the edges of the channels, winding the cord under tension in a multiplicity of turns around the fill material, the cord being stretched about 5 percent to about 40 percent, securing the turns together and axially pressing the sections to planarize the divergent edges of the rings.

14. The method of forming a filled rotary brush section which comprises attaching the end of a cord, which is of synthetic elastomeric plastic, to a monolithic bendable sheet metal channel backing ring of V-shape cross-section, laying the fill material across the edges of the ring while rotating the ring to distribute the fill material as a relatively uniform layer around the perimeter thereof and then to wind at least one turn of the cord under tension elastically stretching the cord about 5 percent to about 40 percent around the mid-portions of the fill material to constrict the fill material within the channel, securing the cord by means acting transversely of the cord to prevent slippage of the cord upon itself, and then subsequently axially pressing the resultant assembly to bend the side walls of the channel backing ring substantially ino parallelism and to double the fill material about the cord, and to compact the mid-portions of the fill material about the cord within the bight portions of said fill material, the channel backing ring being left permanently in place in order to provide a brush section.

15. A rotary brush section comprising a monolithic channel backing ring having substantially parallel sides and having doubled fill material disposed therein, and at least one turn of a cord of elastomeric synthetic plastic material disposed in the bight portions of the doubled fill material and being secured at its end to the channel backing ring and extending through the layer of fill material, the cord being stretched about 5 percent to about 40 percent and the cord being secured by means acting transversely of the cord to prevent slippage of the cord upon itself.

16. The method of forming a filled rotary brush section which comprises attaching the end of a cord, which is of synthetic elastomeric plastic, to the bottom of a monolithic bendable sheet metal channel backing ring of V-shaped cross-section, winding at least one turn of the cord around said ring, laying the fill material across the edges of the ring while rotating the ring to distribute the fill material as a relatively uniform layer around the perimeter thereof and then to wind at least one turn of the cord around the mid-portions of the fill material to constrict the fill material within the channel, securing the cord by means acting transversely of the cord to prevent slippage of the cord upon itself, and then subsequently axially pressing the resultant assembly to bend the side walls of the channel backing ring substantially into parallelism and to double the fill material about the cord, and to compact the mid-portions of the fill material about the cord within the bight portions of said fill material, the channel backing ring being left permanently in place in order to provide a brush section.

17. A rotary brush section comprising a monolithic channel backing ring having substantially parallel sides, at least one turn of a cord of elastomeric synthetic plastic material disposed about the perimeter of said ring and being secured at its end to the channel backing ring, doubled fill material disposed in said channel backing ring and disposed between turns of said cord, said cord extending through the layer of fill material and at least one turn of said cord being disposed in the bight portions of the doubled fill material and the cord being secured by means acting transversely of the cord to prevent slippage of the cord upon itself.

References Cited in the file of this patent

UNITED STATES PATENTS

| | | |
|---|---|---|
| 1,441,936 | McGinnis et al. | Jan. 9, 1923 |
| 1,683,618 | Hoffman | Sept. 11, 1923 |
| 1,818,087 | Nielsen | Aug. 11, 1931 |
| 1,941,343 | Epp | Dec. 26, 1933 |
| 2,105,334 | Scully et al. | Jan. 11, 1938 |
| 2,160,029 | Nielsen | May 30, 1939 |
| 2,609,242 | Nelson | Sept. 2, 1952 |
| 2,932,051 | Mertes | Apr. 12, 1960 |
| 3,002,212 | Tilgner | Oct. 3, 1961 |
| 3,068,504 | Peterson | Dec. 18, 1962 |

FOREIGN PATENTS

| | | |
|---|---|---|
| 29,020 | Great Britain | Dec. 16, 1913 |